US011403617B2

(12) United States Patent
Yoshioka et al.

(10) Patent No.: US 11,403,617 B2
(45) Date of Patent: Aug. 2, 2022

(54) WALLET SYSTEM AND NON-TRANSITORY STORAGE MEDIUM

(71) Applicant: TOYOTA JIDOSHA KABUSHIKI KAISHA, Toyota (JP)

(72) Inventors: Nozomu Yoshioka, Kasugai (JP); Noriaki Mochida, Nagoya (JP); Yuzo Yamada, Nagoya (JP); Tsukasa Karasawa, Nagoya (JP); Yusuke Tomimoto, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 17/024,047

(22) Filed: Sep. 17, 2020

(65) Prior Publication Data

US 2021/0142310 A1 May 13, 2021

(30) Foreign Application Priority Data

Nov. 8, 2019 (JP) .............................. JP2019-202825

(51) Int. Cl.
 *G06Q 20/32* (2012.01)
 *G06Q 20/14* (2012.01)
 (Continued)

(52) U.S. Cl.
 CPC ........... *G06Q 20/325* (2013.01); *G06Q 20/14* (2013.01); *G06Q 20/24* (2013.01); *G06Q 20/36* (2013.01); *G06Q 20/367* (2013.01)

(58) Field of Classification Search
 CPC .................................................. G06Q 20/36
 See application file for complete search history.

(56) References Cited

U.S. PATENT DOCUMENTS 10,853,791 B1 * 12/2020 Ellis ................... G06Q 20/4012
2012/0310824 A1 * 12/2012 Liberty .................. G06Q 40/02
 705/40
(Continued)

FOREIGN PATENT DOCUMENTS

CN 105631649 A 6/2016
JP 2019-087081 A 6/2019
WO WO-2013123438 A1 * 8/2013 ............. G06Q 20/12

OTHER PUBLICATIONS

"Manjumder et al. Pay-Cloak: A Biometric Back Cover for Smartphones: Facilitating secure contactless payments and identity virtualization at low cost to end users, Apr. 2017, IEEE Consumer Electronics Magazine, vol. 6, No. 2, pp. 78-88, entire document" (Year: 2017).*

*Primary Examiner* — Hani M Kazimi
*Assistant Examiner* — Adam Hilmantel
(74) *Attorney, Agent, or Firm* — Oliff PLC

(57) ABSTRACT

A wallet system includes a terminal having a first processor and the first server having a second processor. The first processor is configured to transmit a reloading method registration request to a first server, transmit a reloading request to the first server, and transmit a settlement request to the first server via a terminal of a settlement recipient. The second processor is configured to register a payment method as the reloading method, increase a balance of electronic money in the wallet based on reloading amount information included in the reloading request, and reduce the balance of electronic money in the wallet based on settlement amount information included in the settlement request. The payment method is included in the reloading method registration request.

16 Claims, 11 Drawing Sheets

(51) Int. Cl.
  *G06Q 20/24* (2012.01)
  *G06Q 20/36* (2012.01)

(56) References Cited

U.S. PATENT DOCUMENTS

| | | | |
|---|---|---|---|
| 2013/0054454 A1 | 2/2013 | Purves et al. | |
| 2015/0220914 A1* | 8/2015 | Purves | G06Q 30/0633 705/41 |
| 2018/0240098 A1* | 8/2018 | You | G06Q 20/405 |

* cited by examiner

WALLET SYSTEM AND NON-TRANSITORY STORAGE MEDIUM

INCORPORATION BY REFERENCE

The disclosure of Japanese Patent Application No. 2019-202825 filed on Nov. 8, 2019 including the specification, drawings and abstract is incorporated herein by reference in its entirety.

BACKGROUND

1. Technical Field

The present disclosure relates to a wallet system and non-transitory storage media.

2. Description of Related Art

Japanese Unexamined Patent Application Publication No. 2019-087081 (JP 2019-087081 A) discloses a wallet system that identifies an available medium based on position information of a user and that identifies a settlement medium to be used for settlement based on a usage status of each available medium when a plurality of available media are identified.

SUMMARY

Although a single settlement method can be used in a wallet system, there has been a demand for a wallet system in which a plurality of settlement methods can be used.

The present disclosure provides a wallet system in which multiple settlement methods are available and a non-transitory storage medium.

A first aspect of the present disclosure is a wallet system. A wallet system includes a terminal having a first processor and a first server having a second processor. The first processor is configured to transmit a reloading method registration request to the first server. The reloading method registration request is a request for registering a plurality of different payment methods as a reloading method for a wallet indicating a deposit and withdrawal account of electronic money. The different payment methods is operated by a plurality of business operators. The first processor is configured to transmit a reloading request to the first server. The reloading request is a request for reloading the wallet with the electronic money by a payment method that is registered as the reloading method. The first processor is configured to transmit a settlement request to the first server via a terminal of a settlement recipient. The settlement request is a request for performing settlement with electronic money with which the wallet is reloaded, by using one of a plurality of settlement methods set beforehand. The second processor is configured to register a payment method as the reloading method. The payment method is included in the reloading method registration request. The second processor is configured to increase a balance of electronic money in the wallet based on reloading amount information included in the reloading request. The second processor is configured to reduce the balance of electronic money in the wallet based on settlement amount information included in the settlement request.

In the first aspect, the terminal may include a display. The first processor may be configured to display a settlement method display area that is a rectangular shape on the display. The first processor may be configured to display a name of a settlement method and a settlement button on the settlement method display area. The name of the settlement method may be available to by the terminal. The settlement button may be a button for generating the settlement request by the settlement method.

The first processor may be configured to arrange the name of the settlement method and the settlement button vertically, and configured to display the name of the settlement method and the settlement button in the settlement method display area.

In the first aspect, the first processor may be configured to display the balance of the electronic money or a name of a payment method on the display. The payment method may be associated with the settlement method In the first aspect, the first processor may be configured to display, on the display, a plurality of settlement method display areas in a selectable manner. The first processor may be configured to display the settlement method display area on the display. The settlement method display area may correspond to a settlement method that is used most recently among the plurality of settlement method display areas.

In the first aspect, the first processor may be configured to display a list of a usage history of the plurality of settlement methods on the display.

In the first aspect, the second processor may be configured to transmit information regarding the payment method to a second server. The information regarding the payment method may be registered as the reloading method.

In the first aspect, the first processor may be configured to display a personal identification number input screen on the display at the time of settlement. The personal identification number input screen may be a screen for inputting a personal identification number that is commonly set for the plurality of settlement methods.

In the first aspect, the first processor may be configured to transmit a settlement method registration request to the first server together with the reloading method registration request. The settlement method registration request may be a request for registering a payment method included in the reloading method registration request as a settlement method. The second processor may be configured to register the payment method included in the settlement method registration request as the settlement method.

In the first aspect, the first processor may be configured to display a plurality of different reloading methods side by side on the display when the electronic money is reloaded.

In the first aspect, the first processor may be configured to actively display a function in a non-selected state on the display.

A second aspect of the present disclosure is a non-transitory storage medium storing instructions that are executable by one or more processors included in a terminal and that cause the one or more processors to perform functions. The functions include transmitting a reloading method registration request to a server. The reloading method registration request is a request for registering a plurality of different payment methods as a reloading method of a wallet indicating an electronic money deposit and withdrawal account. The different payment methods is operated by a plurality of business operators. The functions includes transmitting a reloading request to the server. The reloading request is a request for reloading the wallet with the electronic money by a payment method that is registered as the reloading method. The functions includes transmitting a settlement request to the server via a terminal of a settlement recipient. The settlement request is a request for performing a settlement with electronic money with which the wallet is reloaded, by using one of a plurality of settlement methods set beforehand.

In the second aspect, the terminal may have a display. The functions may include displaying a settlement method display area that is a rectangular shape on the display. The functions may include displaying a name of a settlement method and a settlement button on the settlement method display area. The name of the settlement method may be available by the terminal and the settlement button being a button for generating the settlement request by the settlement method.

In the second aspect, the functions may include arranging the name of the settlement method and the settlement button vertically, and displaying the name of the settlement method and the settlement button in the settlement method display area.

In the second aspect, the functions may include displaying a balance of the electronic money or a name of a payment method associated with the settlement method on the display.

In the second aspect, the functions may include displaying on the display, a plurality of settlement method display areas in a selectable manner. The functions may include displaying the settlement method display area on the display. The settlement method display area may correspond to a settlement method that is used most recently among the plurality of settlement method display areas.

In the second aspect, the functions may include displaying a list of a usage history of settlement methods on the display.

In the second aspect, the functions may include displaying a personal identification number input screen on the display at the time of settlement. The personal identification number input screen may be a screen for inputting a personal identification number commonly set for the plurality of settlement methods.

In the second aspect, the functions may include transmitting a settlement method registration request to the server together with the reloading method registration request. The settlement method registration request may be a request for registering a payment method included in the reloading method registration request as a settlement method.

In the second aspect, the functions may include displaying a plurality of different reloading methods side by side on the display when the electronic money is reloaded.

According to the first aspect and the second aspect of the present disclosure, a plurality of settlement methods can be used and thus, convenience is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A wallet system and a wallet program according to an embodiment of the present disclosure will be described with reference to the drawings. The components in the following embodiments include those that can be easily replaced by those skilled in the art, or those that are substantially the same.

Wallet System

Figure 1:
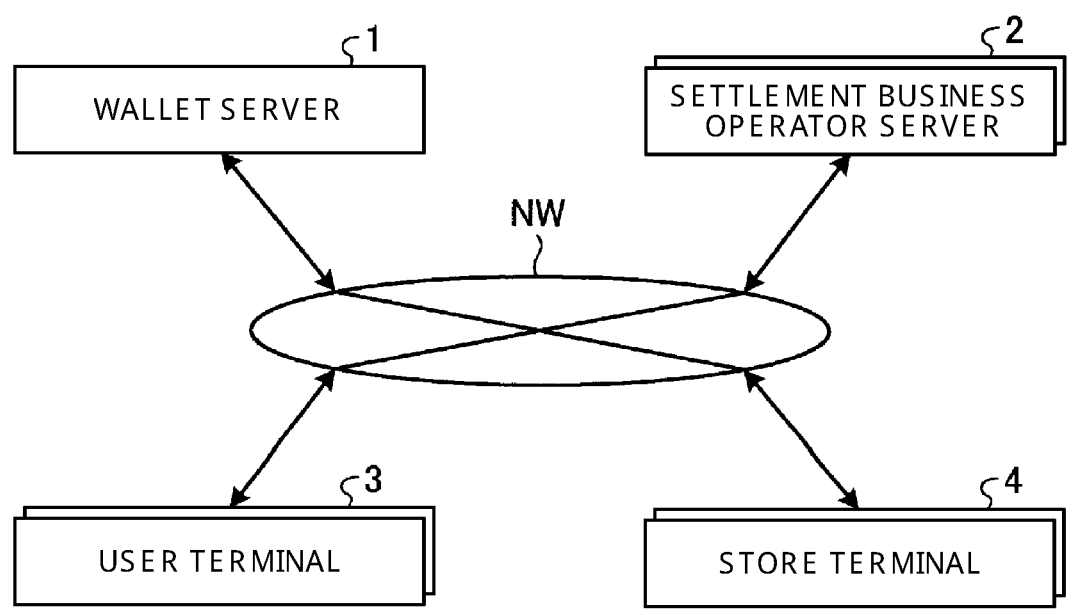
FIG. 1 is a diagram schematically showing the configuration of a wallet system according to the embodiment.
Figure 2:
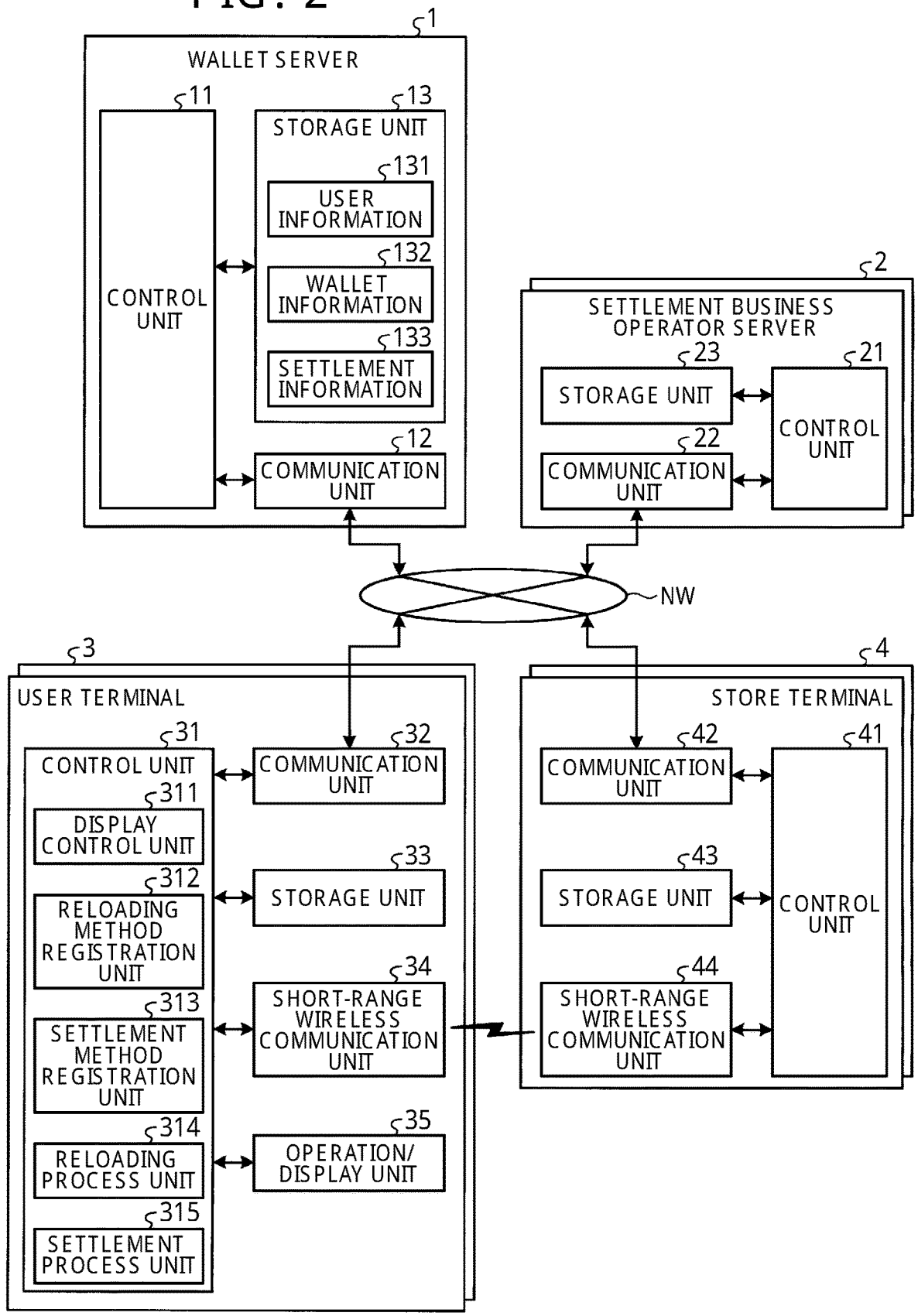
FIG. 2 is a block diagram showing details of each component of the wallet system according to the embodiment.

A configuration of the wallet system according to the present embodiment will be described with reference to FIGS. 1 and 2. As shown in FIG. 1, the wallet system has a wallet server (server) 1, a settlement business operator server 2, a user terminal 3, and a store terminal 4.

The wallet server 1, the settlement business operator server 2, the user terminal 3, and the store terminal 4 are configured to be able to communicate with each other through a network NW. The network NW is composed of the Internet network or a mobile phone network, for example.

Wallet Server

The wallet server (first server) 1 is a server for comprehensively managing the wallet system according to the present embodiment, and is managed by a manager of the wallet system. As shown in FIG. 2, the wallet server 1 includes a control unit (second processor) 11, a communication unit 12, and a storage unit 13.

Specifically, the control unit 11 includes a processor having a central processing unit (CPU), a digital signal processor (DSP), and an field-programmable gate array (FPGA), etc., a memory (main storage unit) having a random access memory (RAM), and a read only memory (ROM), etc.

The control unit 11 loads a program stored in the storage unit 13 into a work area of the main storage unit, executes the program, and controls each component, etc. through the execution of the program to realize a function that matches a predetermined purpose.

The communication unit 12 is configured of a local area network (LAN) interface board, a wireless communication circuit for wireless communication, and the like, for example. The communication unit 12 is connected to a network NW such as the Internet which is a public communication network. The communication unit 12 communicates with the settlement business operator server 2, the user terminal 3, and the store terminal 4 by being connected to the network NW.

The storage unit 13 is configured of a recording medium such as an erasable programmable ROM (EPROM), a hard disk drive (HDD) and a removable media. Examples of the removable media include a universal serial bus (USB) memory and a disc recording media such as a compact disc (CD), a digital versatile disc (DVD), and a Blu-ray (registered trademark) disc (BD). The storage unit 13 can store an operating system (OS), various programs, various tables, various databases, and the like. The storage unit 13 according to the present embodiment stores user information 131, wallet information 132, and settlement information 133 for each user of the wallet system.

The user information 131 is information on the users who use the wallet system. The user information 131 includes, for example, a user ID, a password, the user's name, the user's contact information (for example, an address, a telephone number, an E-mail address, etc.), usage registration history, information on a payment method registered as a reloading method, information on the payment method registered as the settlement method, and a personal identification number at the time of payment, all regarding the user who has registered to use the wallet system. The user ID and the password in the user information 131 are used for an authentication process such as to login to the wallet server 1.

The wallet information 132 is information on a wallet of the wallet system. The wallet is a virtual deposit and withdrawal account for electronic money. Examples of the wallet information 132 include a user ID, an electronic money balance, an electronic money reloading history, and an electronic money usage history.

The settlement information 133 is information on the settlement in the wallet system. The settlement information 133 includes the user ID, the settlement method used for settlement (for example, an electronic money payment (contactless payment), a scan payment, a code payment, etc.), settlement history, etc.

Settlement Business Operator Server

The settlement business operator server 2 is a server for managing user accounts and credit cards, and is provided in financial institutions (for example, banks, credit associations, credit unions, labor credit unions, etc.) and credit card companies. The settlement business operator server 2 includes a control unit 21, a communication unit 22, and a storage unit 23. The control unit 21, the communication unit 22, and the storage unit 23 are physically the same as the control unit 11, the communication unit 12, and the storage unit 13.

The storage unit 23 stores account information and credit card information for each user of the wallet system. The account information includes, for example, the user's name, an account number, an account balance, a deposit and withdrawal history, and the like. The credit card information includes, for example, the user's name, a credit card number, a credit card expiration date, a usage limit amount, a card usage history, and the like.

User Terminal

The user terminal 3 is a computer terminal used by the user. Examples of the user terminal 3 include a smartphone, a mobile phone, a tablet terminal, a wearable computer, a personal computer, and a vehicle navigation system installed in a vehicle, all owned by the user. The user terminal 3 may be any terminal as long as the terminal can exchange information with the wallet server 1.

The user terminal 3 includes a control unit (first processor) 31, a communication unit 32, a storage unit 33, a short-distance wireless communication unit 34, and an operation/display unit (display) 35. The control unit 31, the communication unit 32, and the storage unit 33 are physically the same as the control unit 11, the communication unit 12, and the storage unit 13. The control unit 31 functions as a display control unit 311, a reloading method registration unit 312, a settlement method registration unit 313, a reloading process unit 314, and a settlement process unit 315, through execution of programs.

The display control unit 311 controls display contents on the operation/display unit 35. Based on an operation of the user (a touch operation, a flick operation, etc.), the display control unit 311 displays, on the operation/display unit 35, the following: a member registration screen for when the user registers as a member; a login screen for when logging in to the wallet system; a reloading screen for when reloading the wallet with electronic money; a settlement screen 35a for settlement (see FIGS. 4 to 7 described below); a usage history screen 35b showing a list of the usage history such as settlements (see FIG. 8 described below); a payment history detail screen 35c showing details of the payment history (see FIGS. 9 and 10 described below); a code payment screen 35d (see FIG. 11 described below); and a scan payment screen, etc. The display control unit 311 makes each screen be transitioned based on the user's operation. The details of the settlement screen 35a, the usage history screen 35b, the payment history detail screen 35c, and the code payment screen 35d will be described later.

The reloading method registration unit 312 registers the reloading method for reloading electronic money. Specifically, the reloading method registration unit 312 transmits to the wallet server 1, a reloading method registration request for registering a plurality of different payment methods (such as a bank account, a credit card, and a virtual credit card), which is managed by a plurality of business operators, as the reloading method of the wallet. The control unit 11 of the wallet server 1 that receives the reloading method registration request from the reloading method registration unit 312 stores the payment method included in the reloading method registration request in the storage unit 13 as the user information 131 to register the payment method as the reloading method.

The reloading method registration unit 312 also registers as the reloading method, the payment method that is registered as the settlement method. That is, when a payment method registration request is transmitted from the settlement method registration unit 313 to the wallet server 1, the reloading method registration unit 312 transmits to the wallet server 1, a reloading method registration request that is for registering, as the settlement method, the payment method included in the settlement method registration request. The control unit 11 of the wallet server 1 that receives the reloading method registration request from the reloading method registration unit 312 stores the payment method included in the reloading method registration request in the storage unit 13 as the user information 131 to register the payment method as the reloading method.

Figure 3:
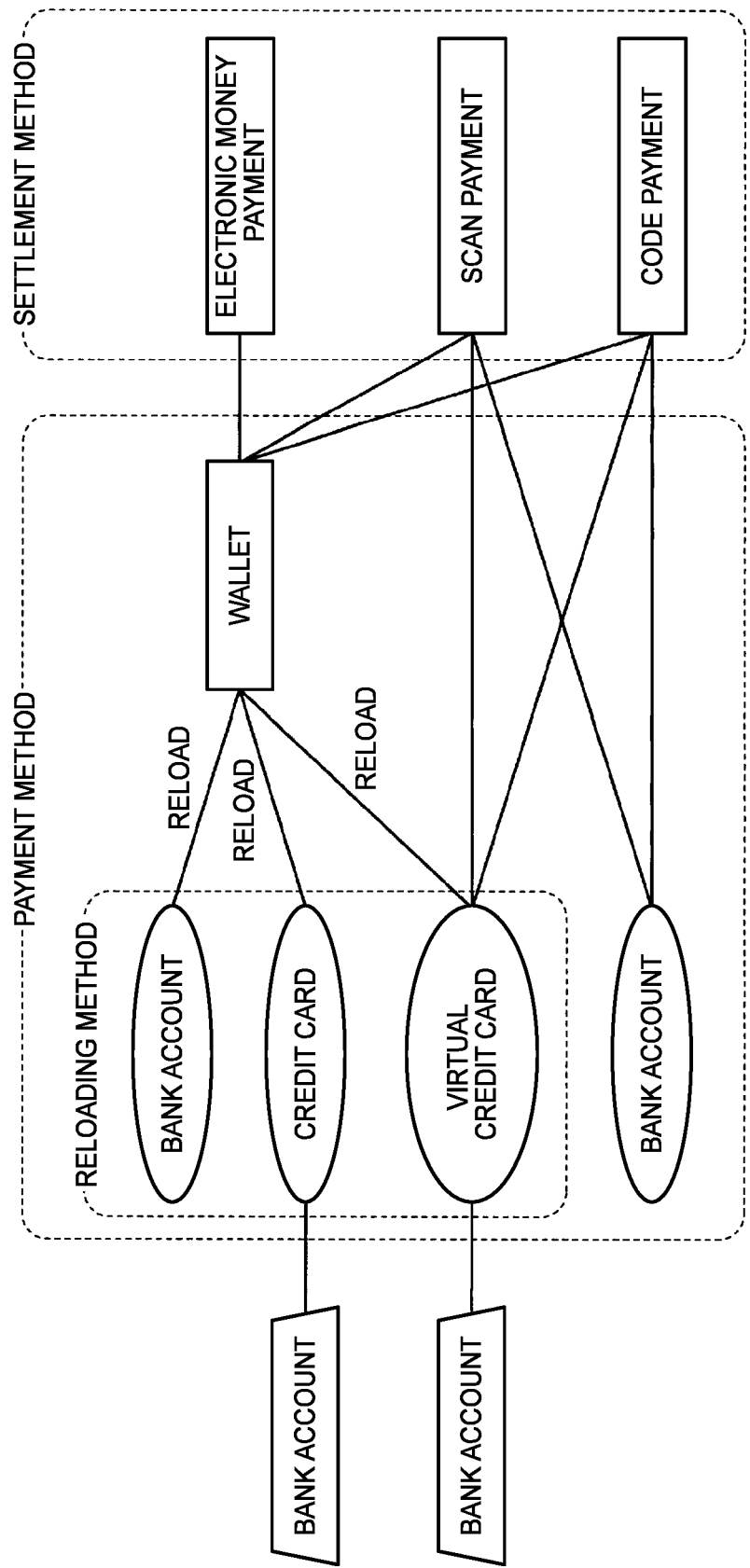
FIG. 3 is a diagram schematically showing relationships between a payment method, a reloading method, and a settlement method in the wallet system according to the embodiment.

Here, FIG. 3 is a diagram schematically showing relationships between the payment method, the reloading method, and the settlement method in the wallet system according to the present embodiment. The "payment method" refers to a method that serves as a funding source when making a settlement. Payment methods include bank accounts, credit cards, virtual credit cards and electronic money balances in wallets. A virtual credit card is an insubstantial credit card, and is composed of information such as a card number, an expiration date, and a personal identification number (security code). A credit card and a virtual credit card are each associated with a bank account, and the usage amount of each card is deducted from the bank account at a later date.

The "reloading method" refers to a method for depositing electronic money into a wallet, which is a virtual deposit and withdrawal account. The reloading method includes a bank account, a credit card and a virtual credit card among the payment methods. By registering a bank account, a credit card and a virtual credit card as the reloading method, it becomes possible to reload the wallet with electronic money. Note that "reload" may be called "load", "refill", "recharge", "top up", "put money on card", "add money to card", and "add value".

The "settlement method" indicates a method of making a settlement using the payment method. The settlement method includes an electronic money payment, a scan payment, and a code payment. The electronic money payment is a contactless settlement between the short-distance wireless communication unit 34 of the user terminal 3 and the short-range wireless communication unit 44 of the store terminal 4 performed by holding the user terminal 3 over the store terminal 4. The scan payment is a settlement made by reading a barcode or a QR code (registered trademark) displayed on the store terminal 4 with a camera of the user terminal 3. The code payment is a settlement performed by reading a barcode or a QR code (registered trademark) displayed on the user terminal 3 with a code reader of the store terminal 4.

In the wallet system according to the present embodiment, three types of settlement methods can be used by using three types of payment methods. That is, in the wallet system, it is possible to combine the payment method and the settlement method as in the following (1) to (3).
(1) An electronic money payment, a scan payment and a code payment using the balance of electronic money in the wallet.
(2) An electronic money payment, a scan payment and a code payment using a virtual credit card.
(3) An electronic money payment, a scan payment and a code payment using a bank account.

As described above, in the wallet system according to the present embodiment, it is possible to reload the wallet with electronic money by the plurality of payment methods, and settle the balance of the electronic money with which the wallet is reloaded, through a plurality of settlement methods.

The settlement method registration unit 313 also registers as the payment method, the payment method to be registered as the reloading method. That is, when a reloading method registration request is transmitted from the reloading method registration unit 312 to the wallet server 1, the settlement method registration unit 313 transmits to the wallet server 1, a settlement method registration request that is for registering, as the settlement method, the payment method that is included in the reloading method registration request.

For example, when the settlement method registration unit 313 registers a payment method (a bank account of a Bank A) as the reloading method, the payment method (the bank account of the Bank A) is also automatically registered as the settlement method. To "register the payment method as the settlement method" means to set the payment method as a payment source in which settlement can be performed, such as setting a bank account of the Bank A to be the payment source and enabling an electronic money payment, a scan payment, and a code payment. The control unit 11 of the wallet server 1 that receives the settlement method registration request from the settlement method registration unit 313 stores the payment method included in the settlement method registration request in the storage unit 13 as the user information 131 to register the payment method as the settlement method.

The reloading process unit 314 reloads the wallet with electronic money. Specifically, the reloading process unit 314 transmits to the wallet server 1, a reloading request for reloading the wallet with electronic money by the payment method registered as the reloading method. The control unit 11 of the wallet server 1 that has received the reloading request from the reloading process unit 314 increases the balance of electronic money in the wallet based on a reloading amount information included in the reloading request. That is, the control unit 11 updates the wallet information 132 stored in the storage unit 13 in accordance with the increase in the balance of electronic money in the wallet.

The settlement process unit 315 performs settlement by the payment method. The settlement process unit 315 transmits to the store terminal 4, a settlement request for settlement that uses one of the preset settlement methods (the electronic money payment, the scan payment, the code payment), with electronic money with which the wallet is reloaded. For example, when making the electronic money payment, the settlement process unit 315 transmits the settlement request to the store terminal 4 via the short-distance wireless communication unit 34. When performing the scan payment, the settlement process unit 315 transmits the settlement request to the store terminal 4 by reading the barcode or the QR code (registered trademark) displayed on the store terminal 4 with the camera of the user terminal 3. Further, when performing the code payment, the settlement process unit 315 transmits the settlement request to the store terminal 4 by causing the code reader or the like of the store terminal 4 to read the barcode or the QR code (registered trademark) displayed on the user terminal 3. The settlement request transmitted from the settlement process unit 315 to the store terminal 4 may or may not include information indicating the settlement amount (hereinafter referred to as "settlement amount information").

Subsequently, the control unit 41 of the store terminal 4 transmits a settlement request including the settlement amount information to the wallet server 1 via the network NW. The control unit 11 of the wallet server 1, which has received the settlement request from the store terminal 4, reduces the balance of electronic money in the wallet based on the settlement amount information included in the settlement request. That is, the control unit 11 updates the wallet information 132 and the settlement information 133 stored in the storage unit 13 in accordance with the reduction amount of the balance of electronic money in the wallet.

The settlement process unit 315 can also perform settlement by a payment method other than the balance of electronic money in the wallet (such as a bank account and a credit card). In such a case, the settlement process unit 315 transmits to the wallet server 1, the settlement request for performing a settlement by using any one of the settlement methods with a bank account or a credit card. The control unit 11 of the wallet server 1, which has received the settlement request from the settlement process unit 315, transmits the settlement amount information included in the settlement request to the settlement business operator server 2.

The storage unit 33 stores data of various screens displayed by the display control unit 311 on the operation/display unit 35. The storage unit 33 temporarily stores the user information 131, the wallet information 132, the settlement information 133, and the like as needed.

The short-distance wireless communication unit 34 has a communication function based on standards such as near field radio communication (NFC), Bluetooth (registered trademark) low energy (BLE), and infrared data association (IrDA). The user terminal 3 performs short-distance wireless communication with the store terminal 4 through the short-distance wireless communication unit 34 when performing the electronic money payment, for example.

The operation/display unit 35 is configured by a touch panel display for example, and has an input function of receiving an operation by the user's finger, a pen, or the like and a display function of displaying various kinds of information based on the control of the display control unit 311.

Store Terminal

The store terminal 4 is provided in a store (member store) in which the wallet system according to the present embodiment can be used, for example. The store terminal 4 includes a control unit 41, a communication unit 42, a storage unit 43, and a short-range wireless communication unit 44. The control unit 41, the communication unit 42, the storage unit 43, and the short-range wireless communication unit 44 are physically the same as the control unit 11, the communication unit 12, the storage unit 13, and the short-distance wireless communication unit 34.

A display control performed by the display control unit 311 for the operation/display unit 35 in the wallet system according to the present embodiment will be described below with reference to FIGS. 4 to 11.

Display Control of Settlement Screen

FIGS. 4 to 7 each show an example of the settlement screen 35a displayed on the operation/display unit 35 by the display control unit 311. In the figure, the settlement screen 35a of virtual settlement methods, which are "A Pay" in which the "electronic money payment" is set as the settlement method, and "B Pay" and "C Pay" in which the "scan payment" and the "code payment" are set as the settlement methods are shown as an example. Specifically, the settlement screen 35a includes a settlement method switching area 351, a settlement method display area 352, a payment method area 353, an additional information area 354, and a menu switching area 355.

The settlement method switching area 351 is an area for switching the settlement method. When any name of the settlement method ("A Pay", "B Pay", or "C Pay") of the settlement method switching area 351 is selected based on the user's touch operation on the operation/display unit 35 for example, the display control unit 311 causes the settlement screen 35a corresponding to the selected payment method to be displayed.

Further, the display control unit 311 causes the name of the settlement method to be actively displayed in the selected state in the settlement method switching area 351.

The term "actively displayed" means that characters are highlighted so that the characters are more prominent than other characters by enlarging the font, changing the font, changing the font color, and inverting the background color (highlight display), etc.

For example, in the settlement method switching area 351 in FIG. 4, "A Pay" in the selected state is actively displayed, and the other "B Pay" and "C Pay" are displayed faintly so as to be inconspicuous (hereinafter, called "inactively displayed"). In addition, in the settlement method switching area 351 in FIGS. 5 and 6, "B Pay" in the selected state is actively displayed, and other "A Pay" and "C Pay" are inactively displayed. Further, in the settlement method switching area 351 of FIG. 7, "C Pay" in the selected state is actively displayed, and other "A Pay" and "B Pay" are inactively displayed. In the wallet system according to the present embodiment, the name of the settlement method in the selected state is actively displayed so that the user can intuitively recognize which payment method they are using.

The settlement method display area 352 is an area for displaying the settlement method. In the settlement method display area 352, the display control unit 311 displays a settlement name 352a indicating the name of the settlement method available on the user terminal 3, a settlement phrase 352b that clearly indicates that the settlement is to be made by the settlement method, and a settlement button 352c for generating the settlement request by the settlement method.

Figure 4:
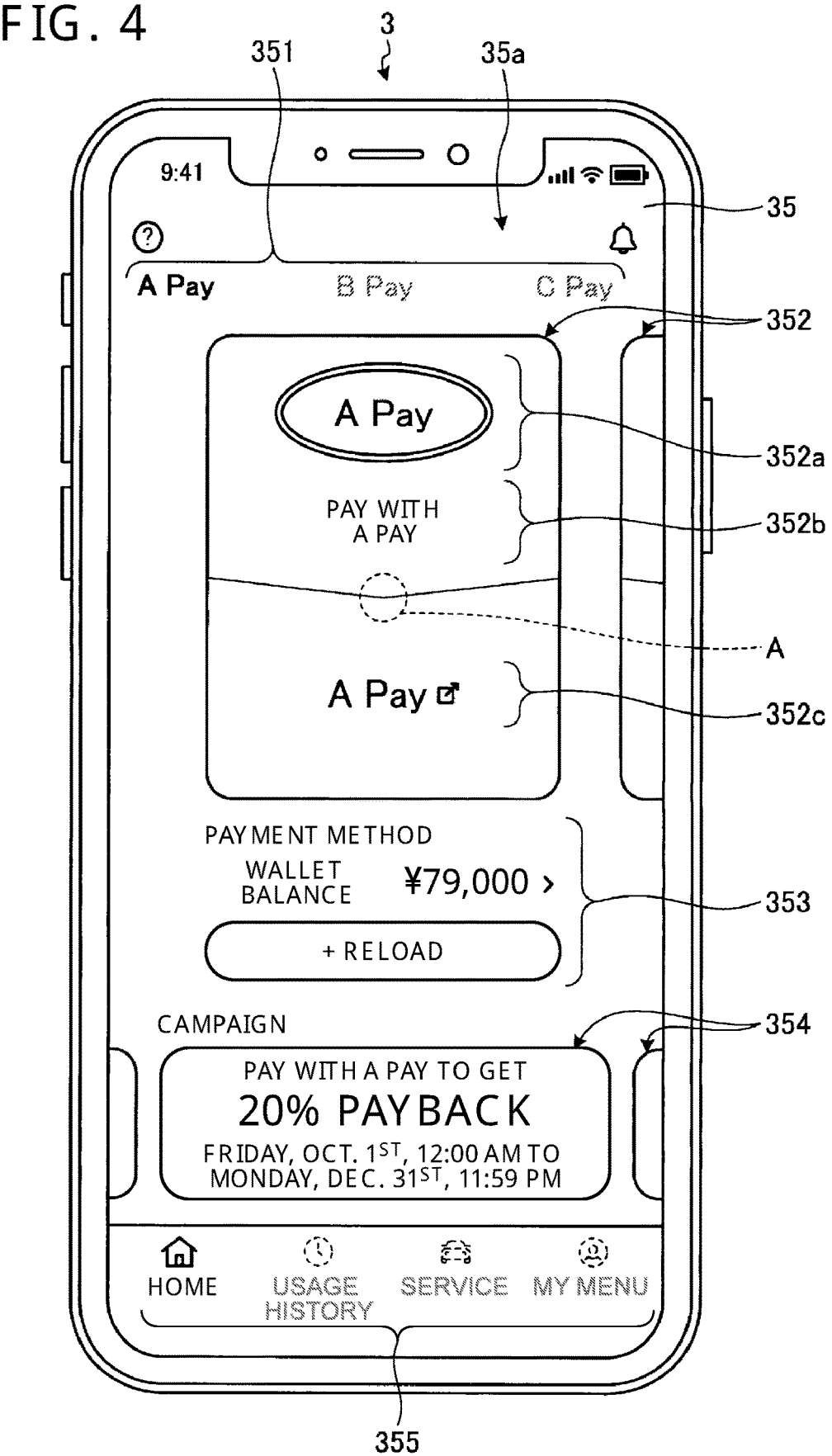
FIG. 4 is a diagram showing an example in which a settlement screen including a settlement method display area of "A pay" is displayed on an operation/display unit of a user terminal in the wallet system according to the embodiment.
Figure 5:
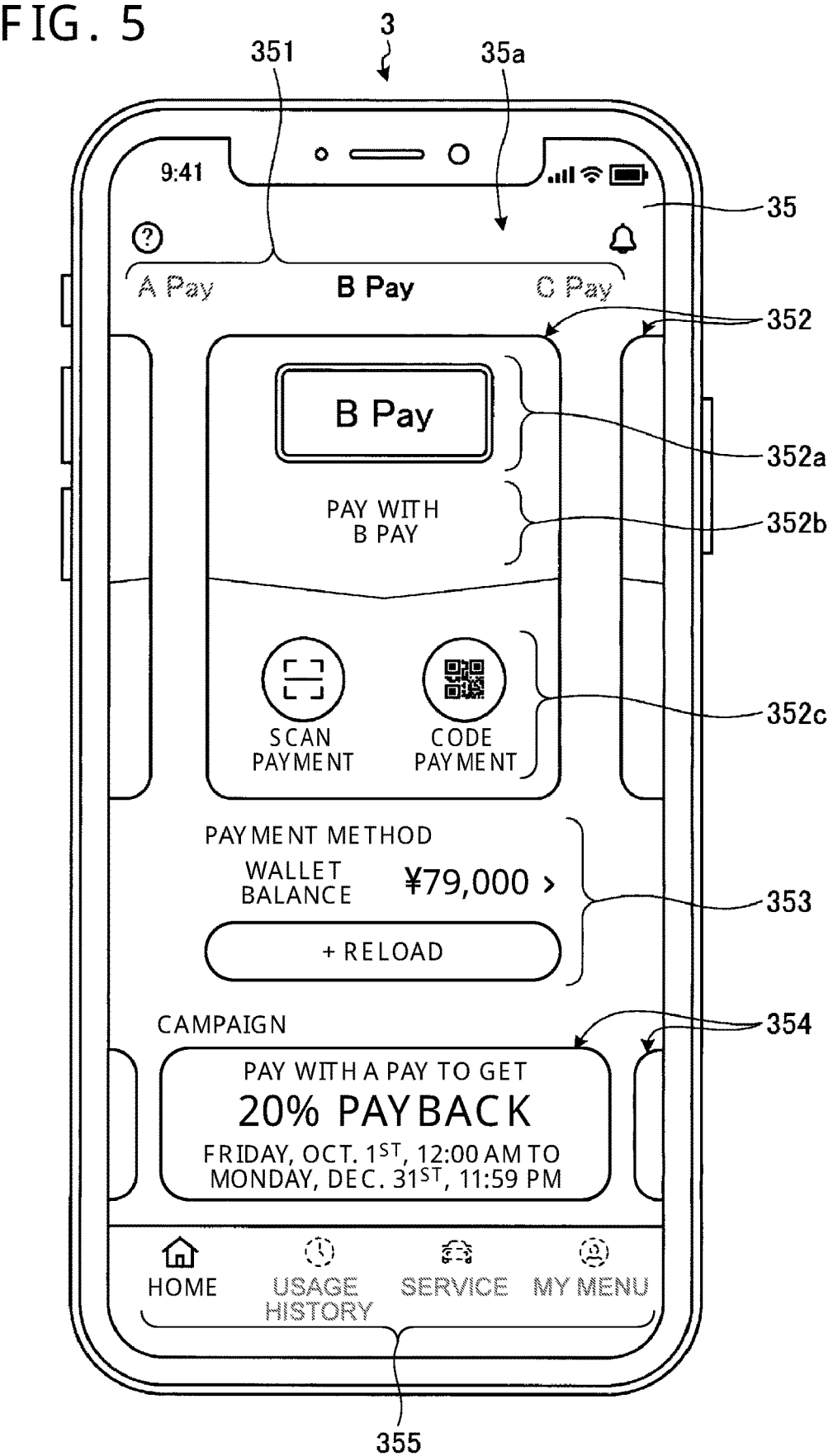
FIG. 5 is a diagram showing an example in which the settlement screen including the settlement method display area of "B pay" is displayed on the operation/display unit of the user terminal in the wallet system according to the embodiment.
Figure 6:
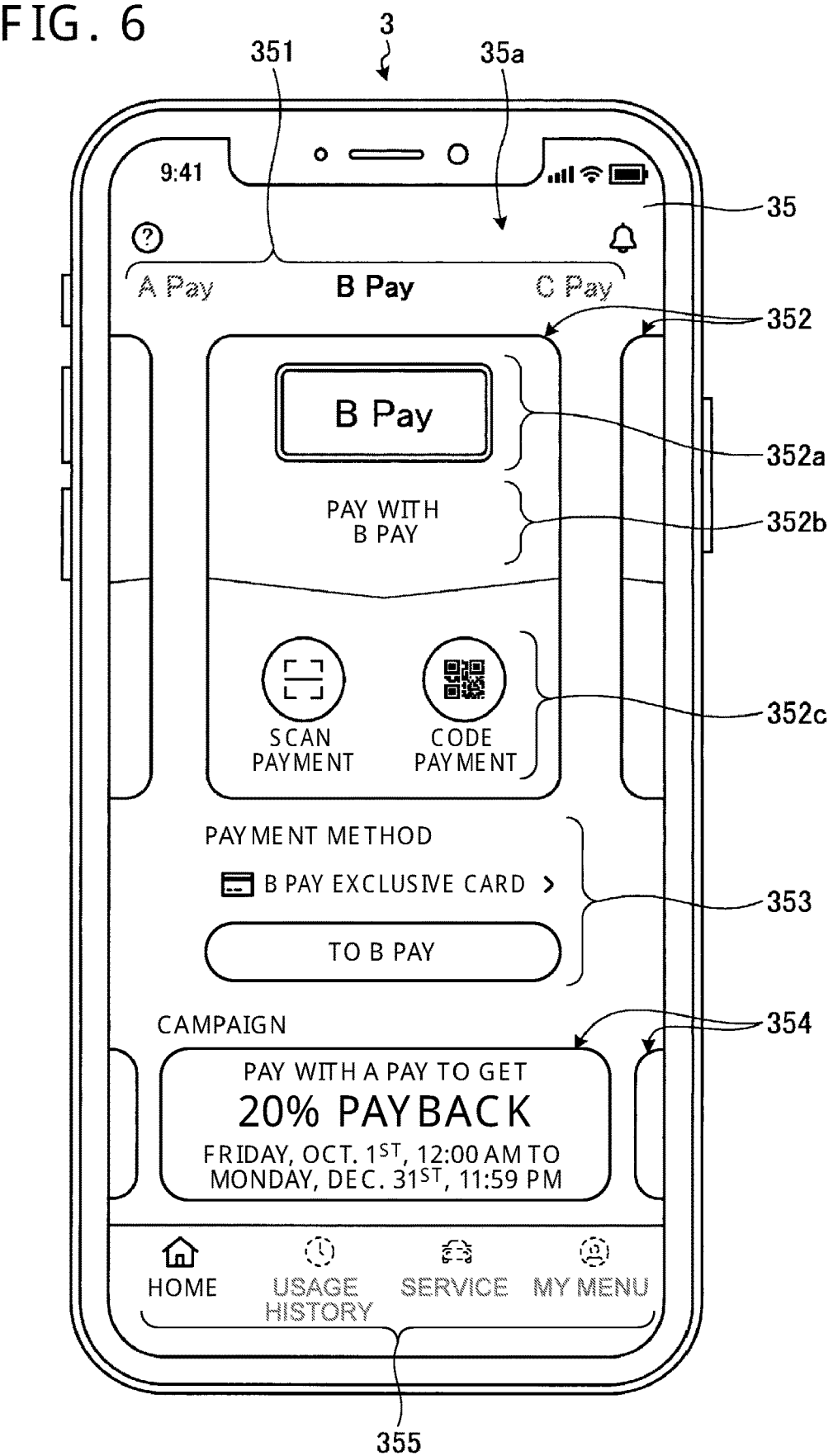
FIG. 6 is a diagram showing an example in which the settlement screen including the settlement method display area of "B pay" is displayed on the operation/display unit of the user terminal in the wallet system according to the embodiment.

For example, in FIG. 4, a logo mark (acceptance mark) of "A Pay" is displayed as the settlement name 352a, the characters "Pay with A Pay" are displayed as the settlement phrase 352b, and an electronic money settlement mark of "A Pay" is displayed as the settlement button 352c. In FIGS. 5 and 6, a logo mark of "B Pay" is displayed as the settlement name 352a, the characters "Pay with B Pay" are displayed as the settlement phrase 352b, and a scan payment mark and a code payment mark are displayed side by side as the settlement button 352c. Further, in FIG. 7, a logo mark of "C Pay" is displayed as the settlement name 352a, the characters "Pay with C Pay" are displayed as the settlement phrase 352b, and the scan payment mark and the code payment mark are displayed side by side as the settlement button 352c.

Here, in FIG. 4, when the user selects the electronic payment mark "A Pay", the display control unit 311 displays an electronic settlement screen prepared in advance. Further, in FIGS. 5 and 6, when the user selects the scan payment mark, the display control unit 311 displays a scan payment screen prepared in advance. In FIGS. 5 and 6, when the user selects the code payment mark, the display control unit 311 displays a code payment screen prepared in advance (see FIG. 11 described below).

In the settlement method display area 352, the display control unit 311 displays the settlement name 352a and the settlement button 352c to be arranged vertically. The display control unit 311 displays the settlement name 352a, the settlement phrase 352b, and the settlement button 352c in order from the top, as shown in FIG. 4. Further, the display control unit 311 displays a boundary line, which has a corner portion composed of two inclined surfaces that incline downward, between the settlement phrase 352b and the settlement button 352c as shown in part A of FIG. 4. In the wallet system according to the present embodiment, the settlement name 352a and the settlement button 352c are displayed to be vertically arranged and the boundary line having the corner portion is displayed, so that the line of sight of the user can be naturally transitioned from the settlement name 352a to the settlement phrase 352b and then to the settlement button 352c in order. Thus, since the user performs operation without hesitation, convenience at the time of settlement is improved.

As shown in FIGS. 4 to 7, the display control unit 311 causes the operation/display unit 35 to display a plurality of settlement method display areas 352 in a selectable manner. The display control unit 311 performs display control so that switching is performed among each settlement method display area 352 (settlement screen 35a) of "A Pay", "B Pay", and "C Pay", based on the user's flick operation on the operation/display unit 35, for example. In the wallet system according to the present embodiment, it is possible to intuitively switch the settlement method on the settlement screen 35a, which improves convenience during settlement.

Further, the display control unit 311 causes the operation/display unit 35 to display the settlement method display area 352 corresponding to the settlement method used most recently, among the plurality of settlement method display areas 352. For example, consider a case in which the wallet program is temporarily terminated after the settlement is made by "C Pay" among "A Pay", "B Pay", and "C Pay". In this case, when the wallet program is activated again, the display control unit 311 first displays the settlement method display area 352 (settlement screen 35a) of "C Pay". In the wallet system according to the present embodiment, the settlement method that is frequently used is displayed first and thus, the convenience at the time of settlement is improved.

The display control unit 311 causes the operation/display unit 35 to display a personal identification number input screen for inputting a personal identification number at the time of settlement. The personal identification number is a numeric string of a predetermined digit set by the user when the user registers to use the wallet service. Further, the personal identification number is commonly set for the plurality of settlement methods. That is, when "A Pay", "B Pay" and "C Pay" can be used as the settlement method, the display control unit 311 requests for the same personal identification number to be input at the time of settlement by each settlement method. In the wallet system according to the present embodiment, by setting a common personal identification number for the settlement methods, there is no need to remember the personal identification number for each settlement method, even if the settlement methods provided by a plurality of settlement business operators are registered. Thus, convenience at the time of settlement is improved.

Figure 7:
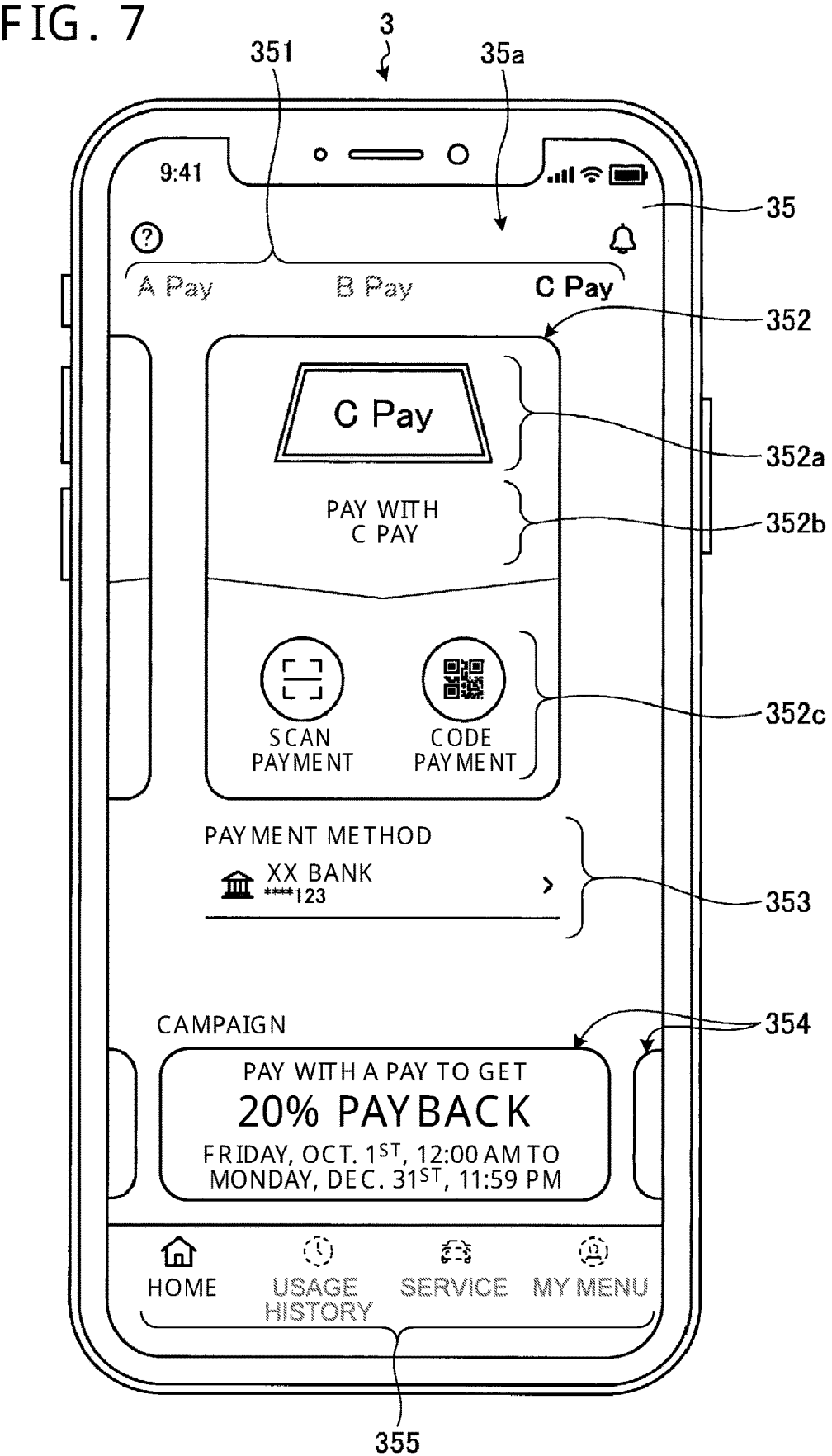
FIG. 7 is a diagram showing an example in which the settlement screen including the settlement method display area of "C pay" is displayed on the operation/display unit of the user terminal in the wallet system according to the embodiment.

A payment method area 353 is an area for displaying the payment method. The display control unit 311 causes the settlement method area 353 to display the balance of electronic money in the wallet or the name of the payment method associated with the settlement method. For example, in the payment method area 353 shown in FIGS. 4 and 5, the balance of electronic money in the wallet and the reloading button ("+ Reload") are displayed. Further, in the payment method area 353 shown in FIG. 6, the name of the virtual credit card (B Pay exclusive card) in association with "B Pay" is displayed. In the payment method area 353 shown in FIG. 7, the bank name and the account number of the bank account in association with "C Pay" are displayed. As shown in FIG. 7, when the account number of the bank account is displayed in the payment method area 353, the display control unit 311 displays only a part of the digits of the account number to prevent a third party from stealing a glance at the account number.

The display control unit 311 displays the reloading screen when the reloading button (see FIGS. 4 and 5) of the payment method area 353 is selected based on the user's touch operation on the operation/display unit 35, for example. The display control unit 311 causes different reloading methods (such as a bank account and a credit card) to be displayed side by side when the wallet is reloaded with electronic money on the reloading screen. Then, the reloading process unit 314 performs the reloading process based on the user's touch operation, etc. In the wallet system according to the present embodiment, since different reloading methods can be used properly when reloading electronic money, convenience at the time of reloading is improved.

An additional information area 354 is an area for displaying additional information. The display control unit 311 causes the additional information area 354 to display information on campaigns related to each settlement method, for example.

The menu switching area 355 is an area for switching menu items. In the examples shown in FIGS. 4 to 7, the menu items include home, usage history, service, and my menu. "Home" is the menu item for displaying the settlement screen 35a. "Usage history" is the menu item for displaying the usage history screen 35b. "Service" is the menu item for displaying a page regarding services (for example, a rental car service) in which the wallet system according to the present embodiment can be used. "My menu" is the menu item for displaying a page for inquiring/changing the user information 131.

Display Control of Usage History Screen

Figure 8:
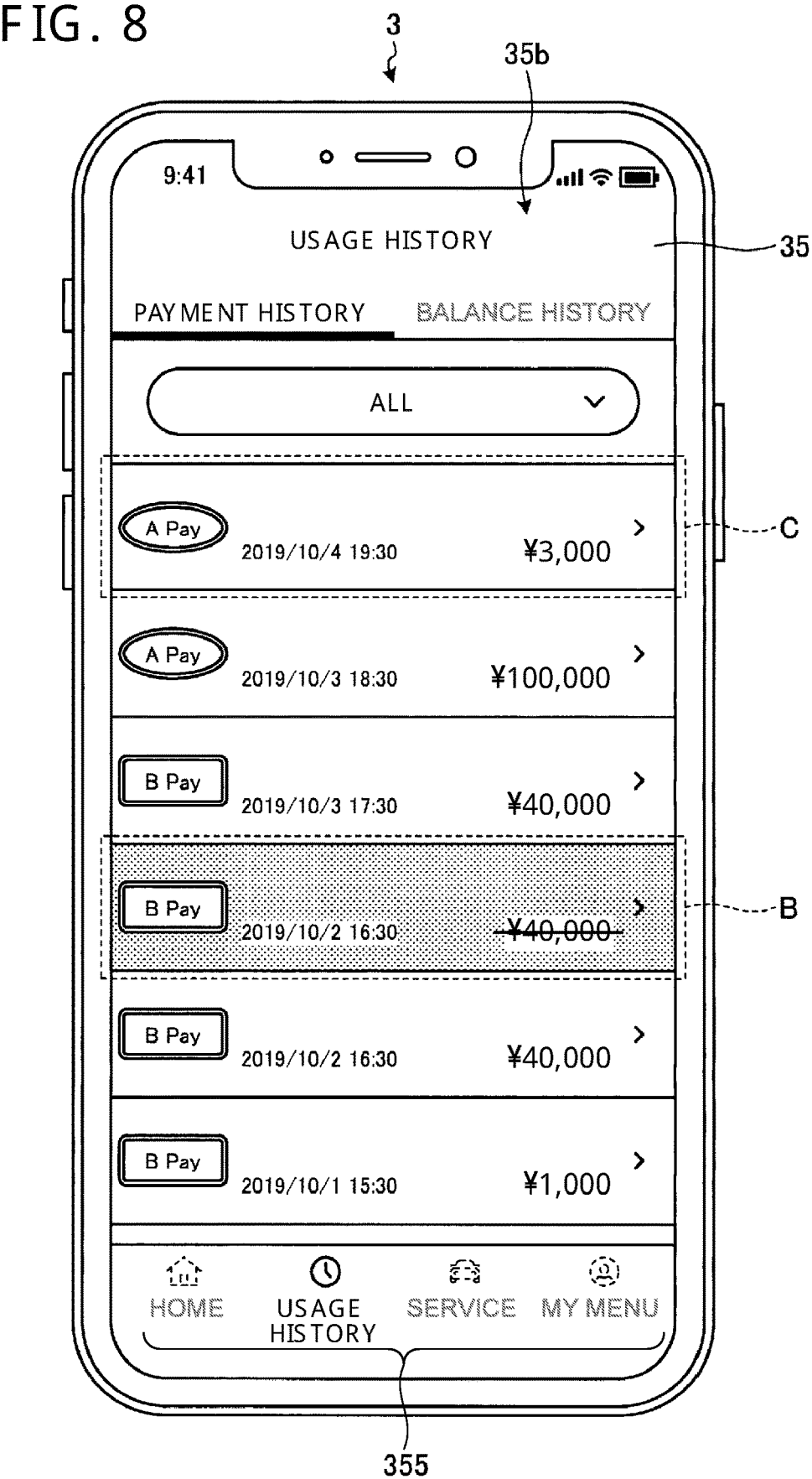
FIG. 8 is a diagram showing an example in which a usage history screen is displayed on the operation/display unit of the user terminal in the wallet system according to the embodiment.

FIG. 8 shows an example of the usage history screen 35b displayed on the operation/display unit 35 by the display control unit 311. As shown in FIG. 8, the display control unit 311 displays separately on the usage history screen 35b, the payment history indicating the settlement history by each settlement method and a balance history indicating a history of the increase/decrease of the balance of electronic money in the wallet.

The display control unit 311 displays a list of the usage history of the settlement methods in the payment history of the usage history screen 35b. In FIG. 8, a list of the payment history is displayed by "A Pay" and "B Pay". For example, when there is a settlement that had been canceled in the payment history, the display control unit 311 displays the settlement amount with a cancellation line drawn as shown in B of FIG. 8. Further, the display control unit 311 displays the canceled settlement row in a gray color for example, so that the canceled settlement can be recognized at a glance.

Display Control of Payment History Detail Screen

Figure 9:
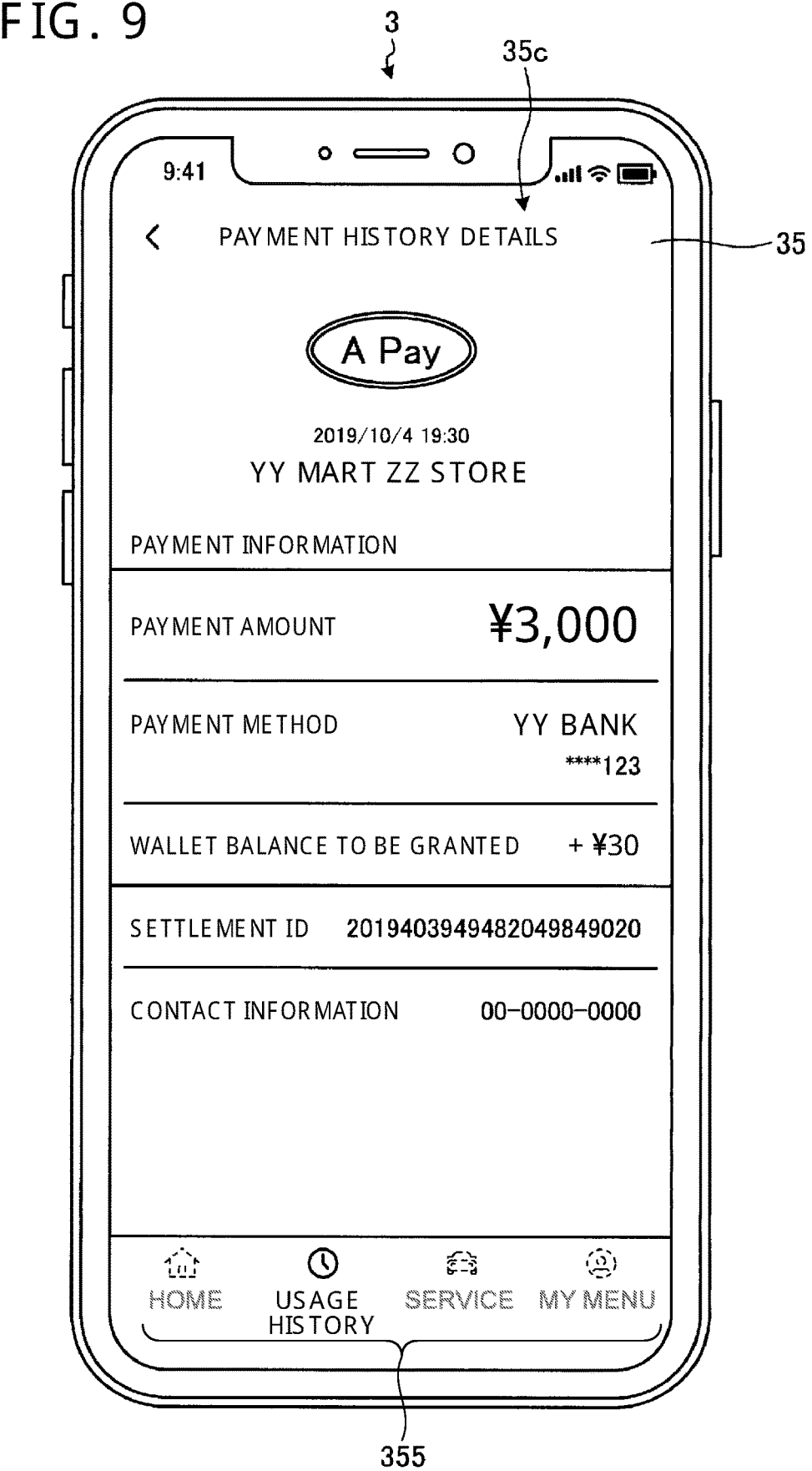
FIG. 9 is a diagram showing an example in which a payment history detail screen is displayed on the operation/display unit of the user terminal in the wallet system according to the embodiment.
Figure 10:
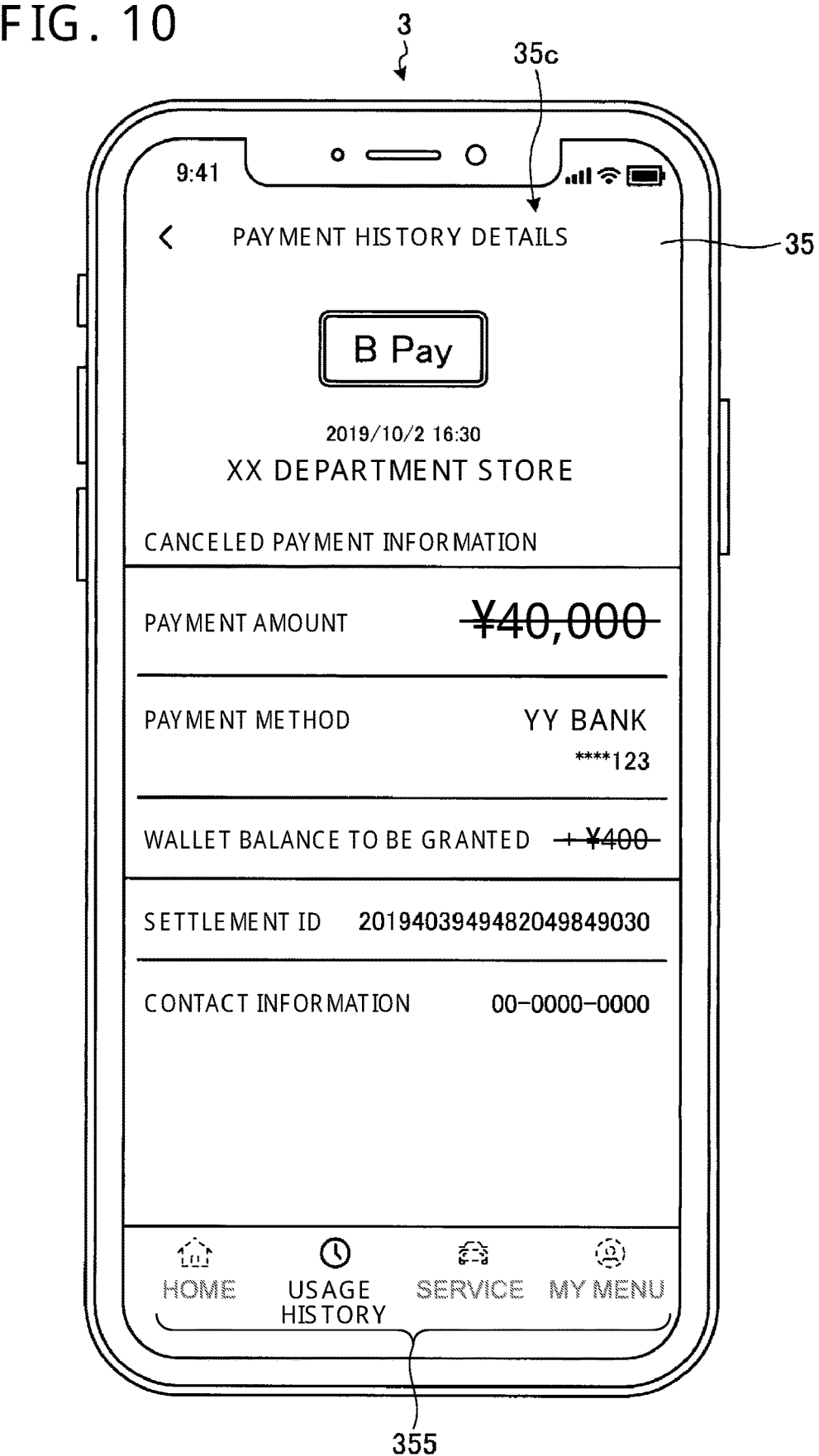
FIG. 10 is a diagram showing an example in which the payment history detail screen is displayed on the operation/display unit of the user terminal in the wallet system according to the embodiment.

FIGS. 9 and 10 show an example of the payment history detail screen 35c displayed on the operation/display unit 35 by the display control unit 311. When an item on the usage history screen 35b is selected based on the user's touch operation on the operation/display unit 35, the display control unit 311 displays the payment history detail screen 35c corresponding to the selected item, for example.

For example, when the item indicated by C is selected on the usage history screen 35b in FIG. 8, the display control unit 311 displays the payment history detail screen 35c as shown in FIG. 9. Further, when the item indicated by B is selected on the usage history screen 35b in FIG. 8, the display control unit 311 causes the payment history detail screen 35c as shown in FIG. 10 to be displayed, for example. The display control unit 311 causes the payment history detail screen 35c to display information such as the payment amount (settlement amount), the payment method, a wallet balance to be granted, a settlement ID, and contact information. The "wallet balance to be granted" refers to points to be granted to the wallet balance in accordance with the payment amount, for example.

Display Control of Code Payment Screen

Figure 11:
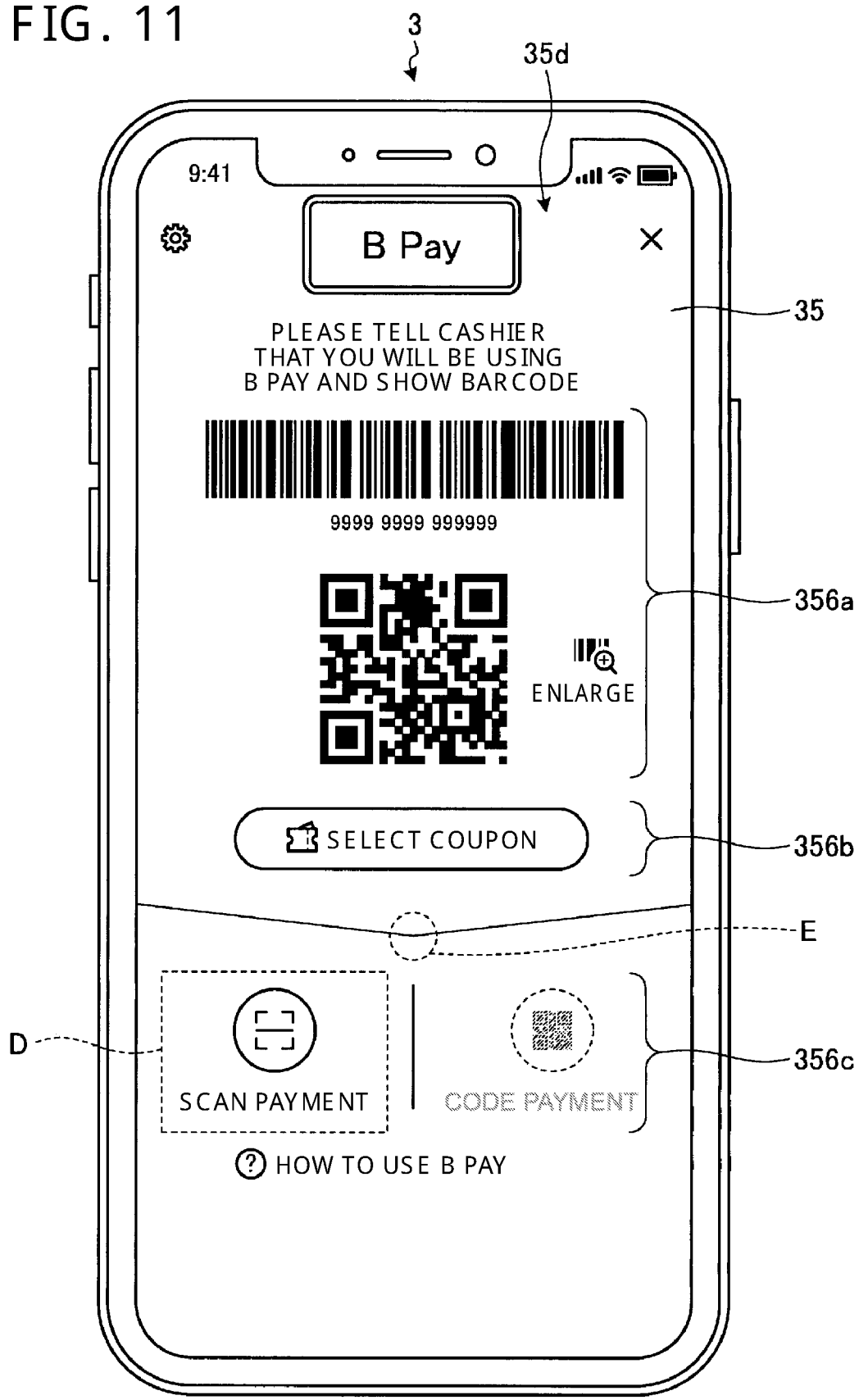
FIG. 11 is a diagram showing an example in which a code payment screen is displayed on the operation/display unit of the user terminal in the wallet system according to the embodiment.

FIG. 11 shows an example of the code payment screen 35*d* displayed on the operation/display unit 35 by the display control unit 311. When the "code payment" of the settlement button 352*c* is selected on the settlement screen 35*a* (see FIG. 5) based on the user's touch operation on the operation/display unit 35 for example, the display control unit 311 displays the code payment screen 35*d* as illustrated in FIG. 11.

The display control unit 311 displays a code image 356*a*, a coupon selection button 356*b*, and a settlement method selection button 356*c* on the code payment screen 35*d*, for example. Further, the display control unit 311 actively displays the non-selected settlement method in the settlement method selection button 356*c*. For example, in FIG. 11, as shown in a D portion, "scan payment" in the non-selected state is actively displayed, and "code payment" in the selected state is inactively displayed. In the wallet system according to the present embodiment, the name of the settlement method in the non-selected state is actively displayed, so that the user can intuitively recognize the existence of another payment method ("scan payment").

The display control unit 311 causes the code image 356*a* and the settlement method selection button 356*c* to be arranged vertically and displayed on the code payment screen 35*d*. For example, as shown in FIG. 11, the display control unit 311 causes the code image 356*a*, the coupon selection button 356*b*, and the settlement method selection button 356*c* to be displayed next to each other and in order from the top. Further, as shown in an E portion in FIG. 11, the display control unit 311 causes a boundary line, which has a corner portion composed of two inclined surfaces that incline downward, to be displayed between the coupon selection button 356*b* and the settlement method selection button 356*c*. In the wallet system according to the present embodiment, the code image 356*a* and the settlement method selection button 356*c* are arranged vertically and displayed and the border line having the corner is displayed, so that the line of sight of the user can be naturally transitioned from the code image 356*a* to the coupon selection button 356*b* and then to the settlement method selection button 356*c* in order. Thus, since the user performs operation without hesitation, convenience at the time of settlement is improved.

As described above, since it is possible to use the plurality of settlement methods in the wallet system and the wallet program according to the present embodiment, convenience is improved.

Broader aspects of the present disclosure are not limited to the particular details and representative embodiments represented and described above. Accordingly, various modifications may be made without departing from the spirit or scope of the general inventive concept as defined by the appended claims and their equivalents.

For example, the control unit 11 of the wallet server 1 may transmit the information regarding the payment method registered as the reloading method to a server (second server) that operates another different service. For example, when the control unit 11 registers a certain payment method (a bank account of a Bank A) as the reloading method, the control unit 11 may provide information regarding the payment method to a server that operates another different service (for example, a rental car service). As a result, even if the user does not register the payment method in the service operated by another business operator, the payment method in the wallet system according to the present embodiment is automatically registered. Thus, the convenience of using the service operated by another business operator is improved.

Further, in the settlement screen 35*a* and the code payment screen 35*d* of the wallet system according to the present embodiment, the user's line of sight is guided by displaying the boundary line having the corner portion (the A portion in FIG. 4 and the E portion in FIG. 11). However, other than such a boundary line, other lines and color changes in the settlement screen 35*a* and the code payment screen 35*d* may be used to guide the user's line of sight.

Further, the wallet system according to the present embodiment can be used for electronic commerce on the Internet in addition to face-to-face settlements in an actual store such as the electronic money payment, the scan payment and the code payment as shown in FIG. 3.

The wallet system according to the present embodiment can be used for settlement performed while the user is driving a vehicle, when the user terminal 3 is a vehicle navigation system mounted in the vehicle.

What is claimed is:

1. A wallet system comprising:
a terminal having a first processor configured to:
transmit a reloading method registration request to a first server, the reloading method registration request being a request for registering each of a plurality of different payment methods as a reloading method for a wallet, the wallet indicating a deposit and withdrawal account of electronic money, the different payment methods being operated by a plurality of business operators,
transmit a reloading request to the first server, the reloading request being a request for reloading the wallet with the electronic money by one of the plurality of different payment methods registered as the reloading method, and
transmit a settlement request to the first server via a settlement recipient's terminal, the settlement request being a request for performing settlement with the electronic money reloaded into the wallet, by using one of a plurality of settlement methods set beforehand which include at least an electronic money payment and a code payment using a balance of the electronic money in the wallet; and
the first server having a second processor configured to:
register each of the plurality of different payment methods as the reloading method, the plurality of different payment methods being included in the reloading method registration request,
increase the balance of the electronic money in the wallet based on reloading amount information included in the reloading request, and
reduce the balance of electronic money in the wallet based on settlement amount information included in the settlement request,
wherein:
the terminal has a display; and
the first processor is further configured to:
display a settlement method display area that is a rectangular shape on the display, and
display (i) a name of a currently selected settlement method among the plurality of settlement methods and (ii) a settlement button on the settlement method display area, the name and the settlement button being arranged vertically with a boundary line with a corner portion between the name and the settlement button, the settlement button being a button for generating the settlement request by the currently selected settlement method, wherein the currently selected settlement method switches to a different one of the plurality of settlement methods upon a user's flick operation on the display of the terminal, and when the code payment is selected as the currently selected settlement method, the display of the terminal displays a barcode or a QR code in the settlement method display area.

2. The wallet system according to claim 1, wherein the first processor is configured to display, on the display outside the settlement method display area the balance of the electronic money in the wallet or a name of one of the registered payment methods associated with the currently selected settlement method.

3. The wallet system according to claim 1, wherein the first processor is configured to:

display, on the display, a plurality of settlement method display areas in a selectable manner, with a currently selected one of the settlement method display areas being displayed in an active state; and display the currently selected settlement method display area on the display, the currently selected settlement method display area corresponding to a settlement method that is used most recently among the plurality of settlement method display areas.

4. The wallet system according to claim 1, wherein the first processor is configured to display a list of a usage history of the plurality of settlement methods on the display.

5. The wallet system according to claim 1, wherein the second processor is configured to transmit information regarding a selected one of the plurality of different payment methods to a second server, the information regarding the selected payment method being registered as the reloading method.

6. The wallet system according to claim 1, wherein the first processor is configured to display a personal identification number input screen on the display at a time of the settlement, the personal identification number input screen being a screen for inputting a personal identification number that is commonly set for all of the plurality of settlement methods.

7. The wallet system according to claim 1, wherein:

the first processor is configured to transmit a settlement method registration request to the first server together with the reloading method registration request, the settlement method registration request being a request for registering a payment method included in the reloading method registration request as a settlement method; and the second processor is configured to register the payment method included in the settlement method registration request as the settlement method.

8. The wallet system according to claim 1, wherein the first processor is configured to display the plurality of payment methods as a plurality of different reloading methods side by side on the display when the electronic money is reloaded into the wallet.

9. The wallet system according to claim 1, wherein the first processor is configured to actively display a function that is in a non-selected state on the display.

10. A non-transitory storage medium storing instructions that are executable by one or more processors included in a terminal and that cause the one or more processors to perform functions comprising:

transmitting a reloading method registration request to a server, the reloading method registration request being a request for registering each of a plurality of different payment methods as a reloading method of a wallet, the wallet indicating an electronic money deposit and withdrawal account, the different payment methods being operated by a plurality of business operators;

transmitting a reloading request to the server, the reloading request being a request for reloading the wallet with the electronic money by one of the plurality of different payment methods registered as the reloading method; and transmitting a settlement request to the server via a settlement recipient's terminal, the settlement request being a request for performing a settlement with the electronic money reloaded into the wallet, by using one of a plurality of settlement methods set beforehand which include at least an electronic money payment and a code payment using a balance of the electronic money in the wallet, wherein:

the terminal has a display; and the functions further comprise:

displaying a settlement method display area that is a rectangular shape on the display, and displaying (i) a name of a currently selected settlement method among the plurality of settlement methods and (ii) a settlement button on the settlement method display area, the name and the settlement button being arranged vertically with a boundary line with a corner portion between the name and the settlement button, the settlement button being a button for generating the settlement request by the currently selected settlement method, wherein the currently selected settlement method switches to a different one of the plurality of settlement methods upon a user's flick operation on the display of the terminal, and when the code payment is selected as the currently selected settlement method, the display of the terminal displays a barcode or a QR code in the settlement method display area.

11. The non-transitory storage medium according to claim 10, wherein the functions further comprise displaying, on the display outside the settlement method display area, a balance of the electronic money in the wallet or a name of one of the registered payment methods associated with the currently selected settlement method.

12. The non-transitory storage medium according to claim 10, wherein the functions further comprise:

displaying on the display, a plurality of settlement method display areas in a selectable manner, with a currently selected one of the settlement method display areas being displayed in an active state; and displaying the currently selected settlement method display area on the display, the currently selected settlement method display area corresponding to a settlement method that is used most recently among the plurality of settlement method display areas.

13. The non-transitory storage medium according to claim 10, wherein the functions further comprise displaying a list of a usage history of settlement methods on the display.

14. The non-transitory storage medium according to claim 10, wherein the functions further comprise displaying a personal identification number input screen on the display at a time of the settlement, the personal identification number input screen being a screen for inputting a personal identification number commonly set for all of the plurality of settlement methods.

15. The non-transitory storage medium according to claim 10, wherein the functions further comprise transmitting a settlement method registration request to the server together with the reloading method registration request, the settlement method registration being a request for registering a payment method included in the reloading method registration request as a settlement method.

16. The non-transitory storage medium according to claim 10, wherein the functions further comprise displaying the plurality of payment methods as a plurality of different reloading methods side by side on the display when the electronic money is reloaded into the wallet.

* * * * *